Dec. 17, 1968
P. ERDMAN
3,416,298
CROP HARVESTING MACHINE
Filed April 13, 1965
5 Sheets-Sheet 5
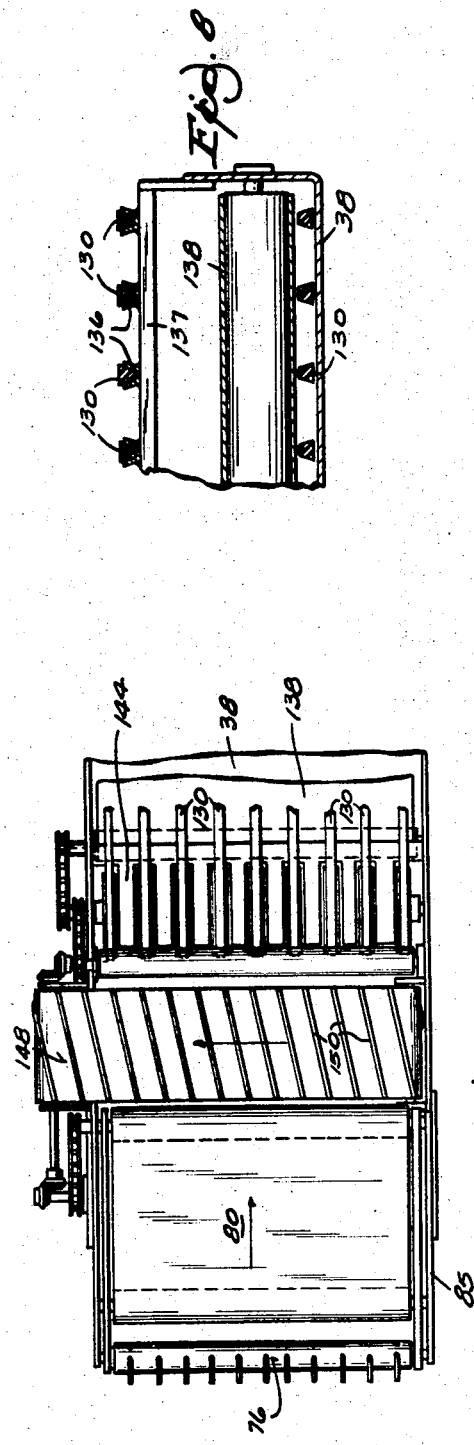
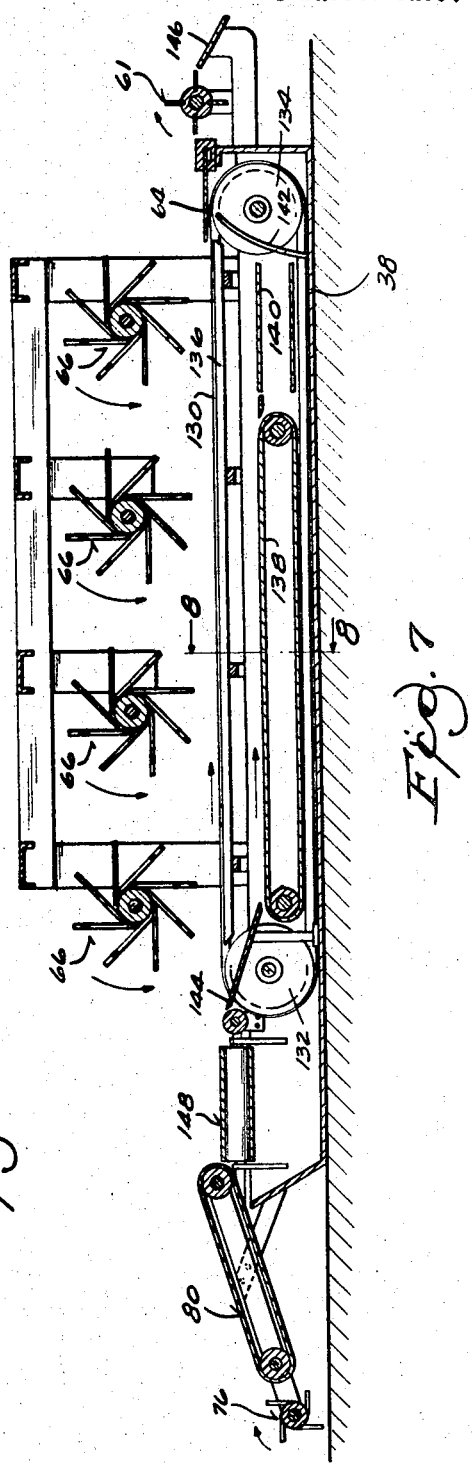
INVENTOR
PAUL ERDMAN
Lieber & Nilles
ATTORNEYS United States Patent Office 3,416,298
Patented Dec. 17, 1968

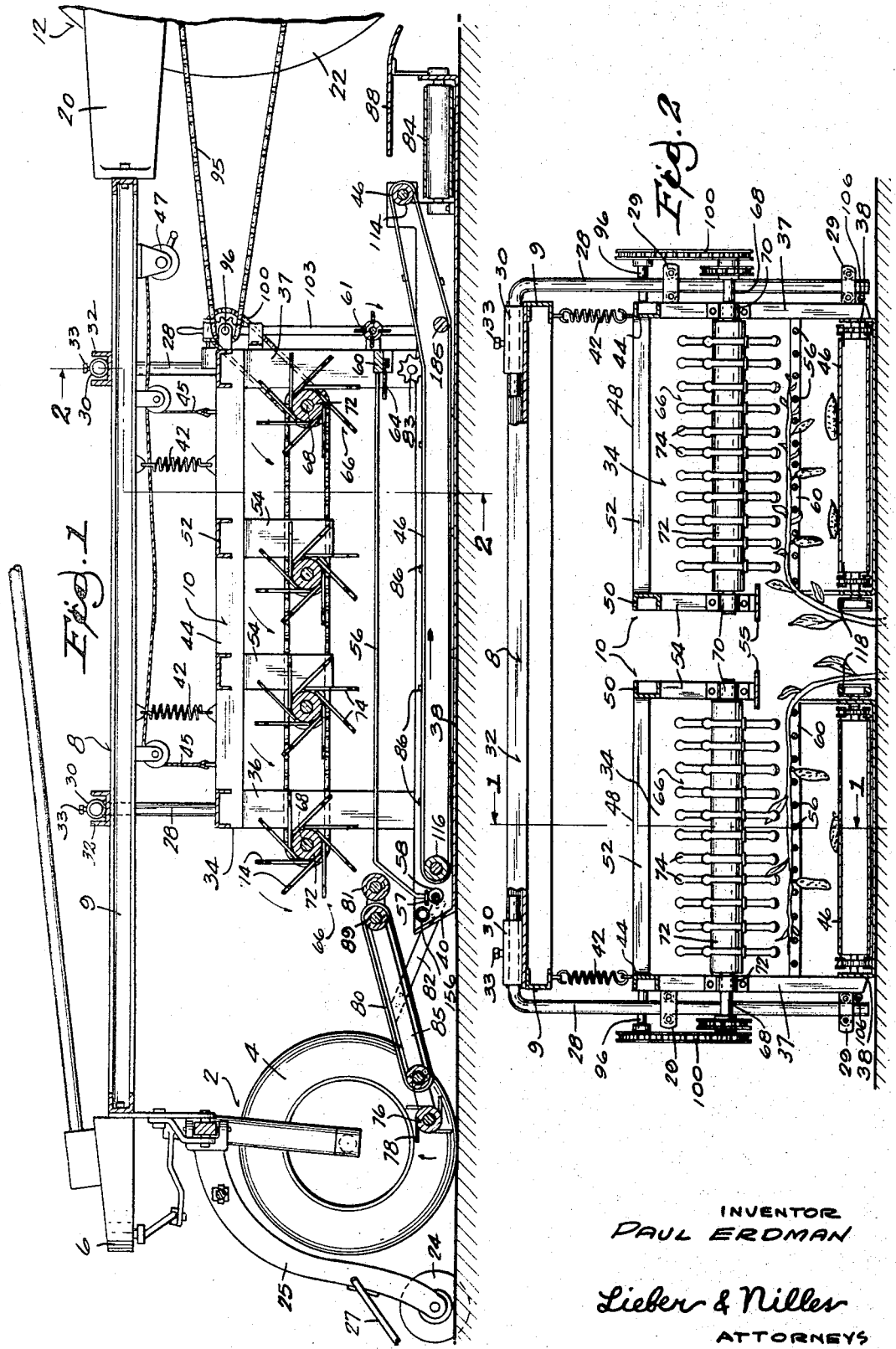

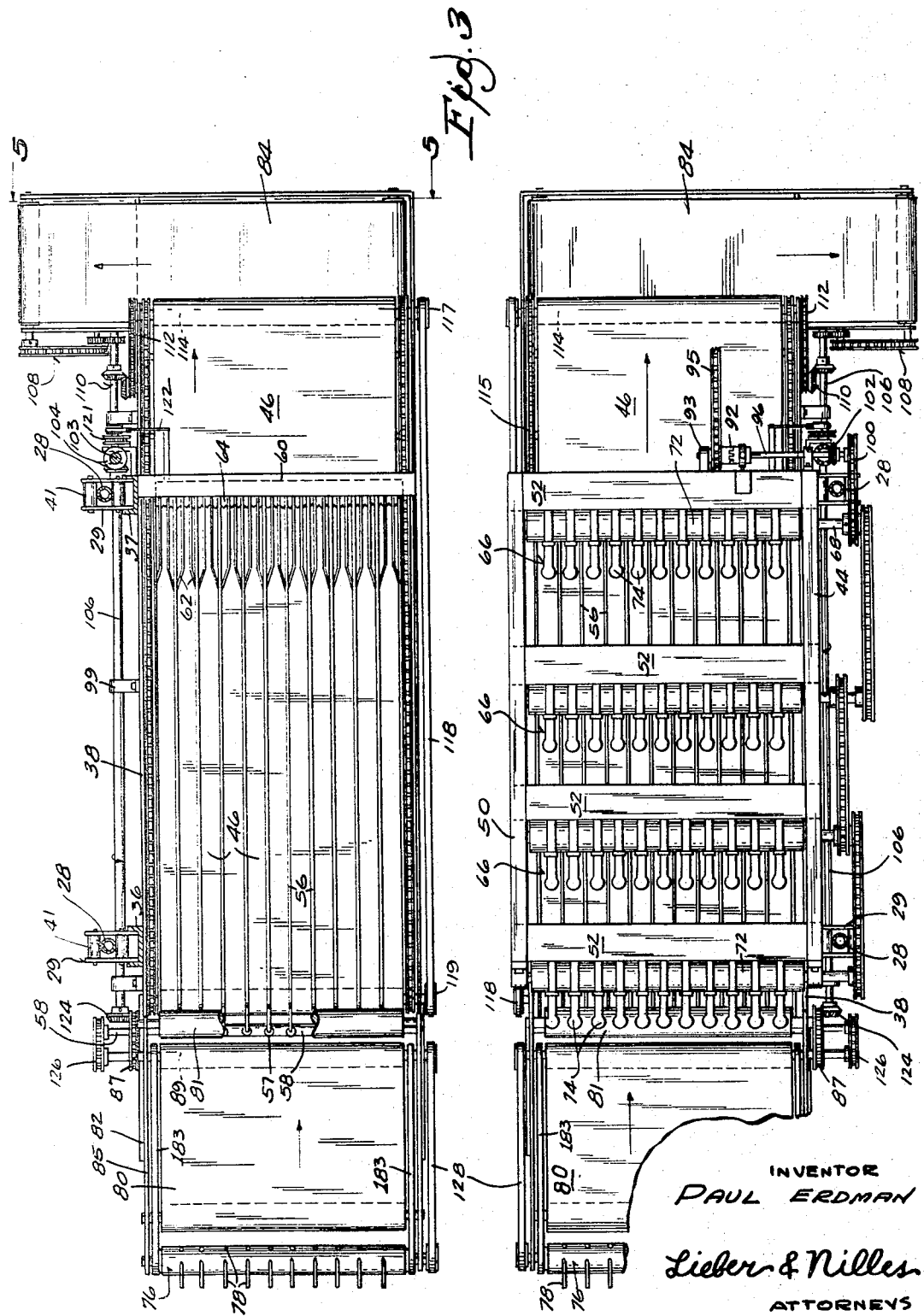

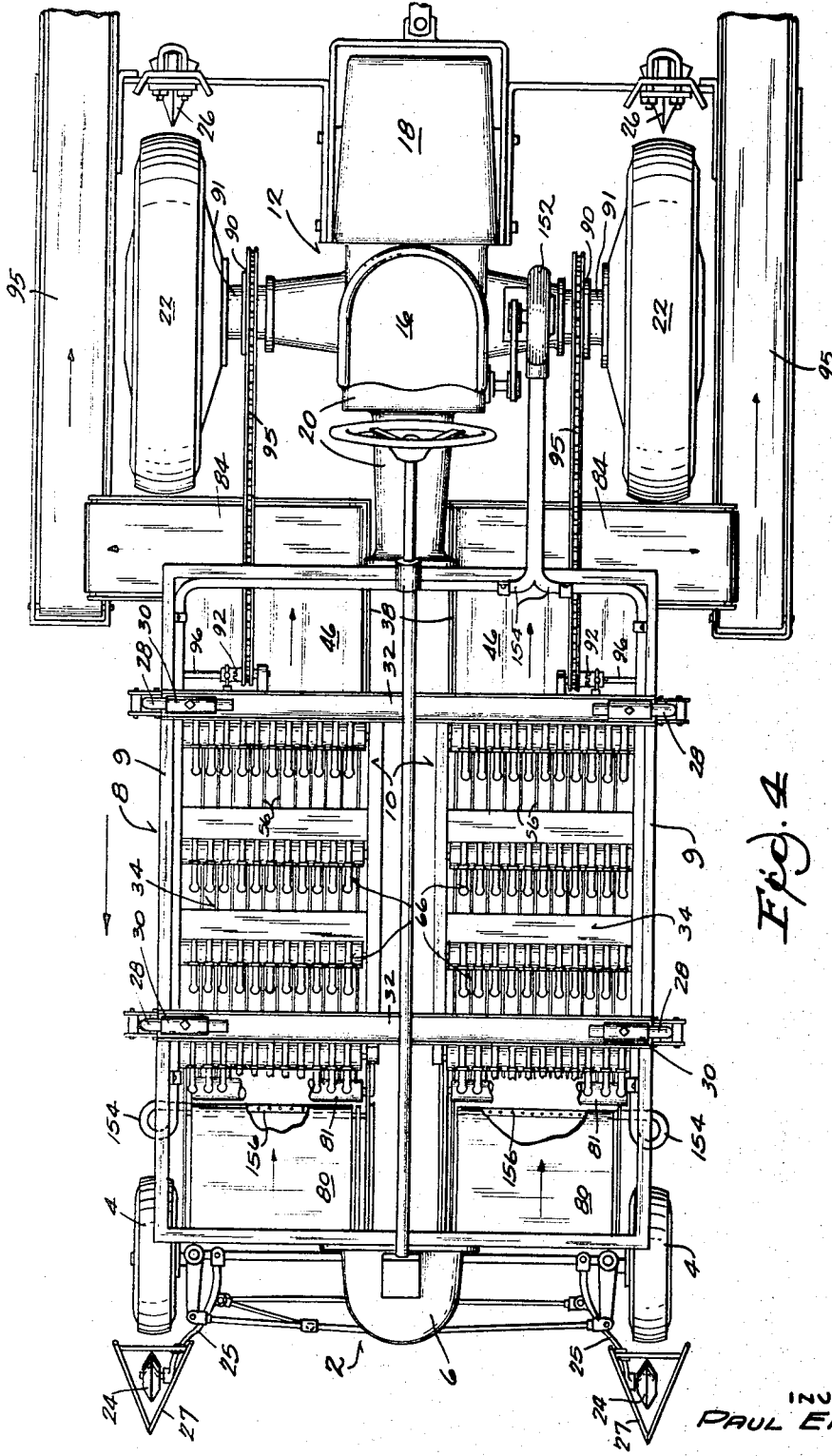

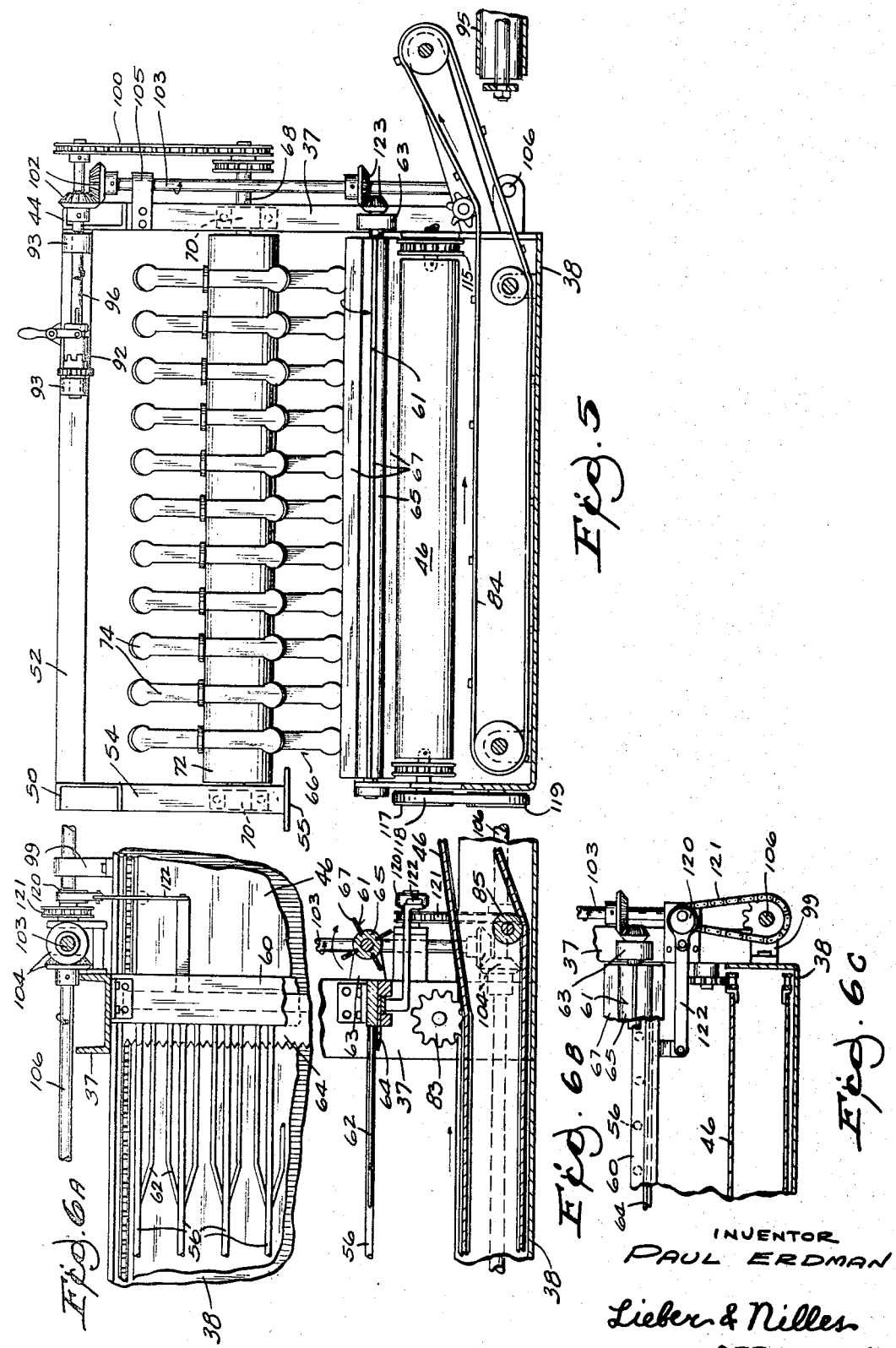

3,416,298
CROP HARVESTING MACHINE
Paul Erdman, Rte. 1, Almond, Wis. 54909
Filed Apr. 13, 1965, Ser. No. 447,707
17 Claims. (Cl. 56—327)

ABSTRACT OF THE DISCLOSURE

A crop harvesting machine having laterally spaced vegetable removing means which are propelled along either side of a row of vines by a prime mover. The vegetable removing means are provided with means to lift the vines from their growing position and place them in the vegetable removing means. The vegetable removing means removes the vegetables from the vines, conveys them from the machine, and returns the vines to their growing position.

Background

Cucumbers constitute an important crop in many sections of the country due mainly to their use in the making of pickles. The crop is planted annually and is grown on low, bushy vines which are unstaked in the field.

In the past, cucumbers have been harvested by hand labor. However, this has proved difficult and expensive, particularly if the cucumbers are to be used for pickles. Only cucumbers of a certain size and ripeness are suitable for this purpose. Locating and removing such cucumbers in the low, bushy vines has required an inordinate amount of "stoop" labor, and while such labor has been available, mainly from immigrant farm labor sources, the supply is declining and its use becoming more expensive.

Additionally, the vines must be repeatedly harvested to remove cucumbers of the correct ripeness and size approximately every four days during the four-month harvesting season. Not only, therefore, has the harvesting of cucumbers by hand been expensive from the labor standpoint, but it has often resulted in portions of the crop being left on the vines past the point of desired ripeness for pickles. A loss of a portion of the crop or a reduction in the price received therefor has occurred.

Summary

Accordingly, the present invention provides a machine for removing vegetables and fruits, such as cucumbers, of the desired ripeness from the growing vines in a rapid and efficient manner. The machine so provided does not uproot or otherwise disturb the vines thereby permitting its use for as many harvesting operations as necessary during the growing season of the vegetables. Additionally, the machine harvests only ripe vegetables, allowing the unripened vegetables to remain on the vine to ripen.

The present invention provides for a crop harvesting machine mounted on a prime mover. The machine includes two vegetable removing means which are propelled along either side of the row of vines by the prime mover. The vegetable removing means are provided with means to lift the vines from their growing position and to place them in the vegetable removing means perpendicular to the direction of travel.

The vines while in the vegetable removing means are supported by a structure through which the ripe vegetables or fruits may extend. Means are provided to move the vines along the grate and to extend the ripe vegetables through the supporting structure. A cutter, mounted at the end of said supporting structure, severs those ripe vegetables extending through the supporting structure that have not already fallen from the vine. The harvested vegetables are transported from the machine by a conveyor.

The drawings

The invention, both as to its structure and mode of operation, may be better understood by reference to the following specification and drawings forming a part thereof, in which:

FIGURE 1 is a longitudinal, cross-sectional view of the crop harvesting machine of this invention taken along line 1—1 of FIGURE 2;

FIGURE 2 is a view taken along line 2—2 of FIGURE 1;

FIGURE 3 is a top view of the crop harvesting machine with certain portions thereof removed for clarity;

FIGURE 4 is a top view of the crop harvesting machine including the associated prime mover;

FIGURE 5 is a cross-sectional view taken along line 5—5 of FIGURE 3 showing portions of the power train and the conveyor;

FIGURES 6A, B, and C show the cutter and additional details of the power train;

FIGURE 7 is a longitudinal cross-sectional view of another embodiment of the crop harvesting machine of this invention;

FIGURE 8 is a view taken along line 8—8 of FIGURE 7, showing details of the alternate embodiment; and FIGURE 9 shows additional details of the alternate embodiment.

Detailed description

Referring now to the figures, there is shown therein a crop harvesting machine of the present invention. The machine is propelled and powered by a prime mover which may be any of a number of available agricultural or garden tractors or vehicles. A Model G tractor manufactured by the Allis-Chalmers Manufacturing Company of Milwaukee, Wis., has been found to be satisfactory for such purpose and is illustrated in the drawings (see Figure 4). The tractor consists of a front end assembly 2 containing the front wheels 4 and steering gear 6; an agricultural implement attachment section 8 comprised of longitudinal members 9 for attaching a variety of agricultural implements, including the crop harvesting device 10 of the present invention; and a power section 12 containing the operator's seat 16, engine 18, transmission 20, and driving wheels 22. The prime mover may be adapted for self-steering operation by the inclusion of weighted wheel 24 attached to steering gear 6 by arm 25. The wheel 24 is adapted to run in a groove in the ground corresponding to the desired path of the vehicle and to guide the vehicle along that path. Plows 27 separate the vines ahead of wheels 24. The groove is reformed after the passage of the prime mover by wheels 26 mounted at the rear of the vehicle.

Turning now to the crop harvesting machine 10, the machine is supported on the attachment section 8 by a plurality of L-shaped standards 28, adjustably fitted in collars 30. Collars 30 are mounted inside stiffening members 32. Set screws 33 permit standards 28 to be adjusted outwardly or inwardly to provide for the harvesting of vines of varying denseness.

Two vegetable removing means 34 are mounted on standards 28. The vegetable removing means 34 are adapted to be positioned, by adjustment of standards 28, on either side of the row of vines to perform the harvesting operation as they are propelled down the row of vines. Two sleeves 29 loosely encompassing each of the standards 28 are fastened to vertical frame members 36 and 37 of vegetable removing means 34. The lower ends of vertical frame members 36 and 37 are affixed to, and supported by, a pair of long, low, metal pans 38 running the length of each of the vegetable removing means 34. Pans 38 travel along the ground adjacent the vines and are aided in their forward movement by sledge-like front portions 40. The vertical movement of vertical frame members 36 and 37 relative to standards 28, permitted by rollers 41 in sleeves 29, allows vegetable removing means 34 to compensate for the uneven ground over which pans 38 must travel. The movement is further assisted by counterbalance springs 42 fastened between longitudinal member 9 and outer, upper frame member 44. The latter member is fastened to vertical frame members 36 and 37. Cables 45 fastened on the same frame member and ratchet drum 47 mounted on longitudinal member 9 permit vegetable removing means 34 to be raised off the ground for turning, repairs, or transport.

Each of the pans 38 contains a conveyor 46 running substantially the length of the pan, which serves to transport harvested vegetables to the rear of the pan.

An upper frame 48 for each vegetable removing means 34 comprises the aforementioned outer, upper frame member 44, inner, upper frame member 50, and lateral members 52. A plurality of bearing hangers 54 extend downward a short distance at intervals along the length of inner, upper frame member 50 and along outer, upper frame member 44 between vertical frame members 36 and 37. The bearing hangers 54 mounted on inner, upper frame member 50 must be short enough to permit the vines to enter the machine for harvesting as shown in FIGURE 2. An elongated rail 55 is mounted on the lower end of these bearing hangers 54 to assist the vines in entering the machine and to prevent them from becoming tangled in the bearing hangers.

Vine supporting structures extend over conveyors 46 for the major portion of their length in pans 38. As shown in FIGURE 2, these may be grate structures 56, the forward ends of which rest on driven eccentric rollers 58 mounted in pans 38. Eccentric rollers 58 vibrate the grates 56 as the crop harvesting machine is propelled along a row of vines. Pads 57 mounted on the ends of the members of grates 56 assist in this operation. The rearward ends of grates 56 are fixedly mounted to horizontal bars 60 which extend inwardly from vertical frame members 37 on both vegetable removing means 34. As best seen in the upper portion of FIGURE 3 and in FIGURE 6A, the rearward portion of grates 56 contains a plurality of vegetable guides 62 mounted on either side of the individual members making up grate 56. The vegetable guides direct the vegetables or fruits extending through the grates 56 to reciprocating cutters 64 mounted under horizontal bars 60. The edges of vegetable guides 62 are sharpened to assist in severing the vegetables from the vines.

Wind-up rolls 61 are positioned immediately behind bars 60 and are journalled in pillow blocks 63 mounted thereon and on vertical frame members 37. The wind-up rolls 61 consist of cores 65 having rubber blades 67 mounted thereon. Wind-up rolls 61 are driven faster than the other operative parts of vegetable removing means 34, as described below, so that rubber blades 67 engage the vines at the rear end of grates 56 and pull them rearward. This pulls the vegetables up into cutters 64 so that no stem is left on them when cutters 64 sever them from the vines.

In addition to the aforementioned vibrating action of grates 56, the vegetable carrying vines are moved toward cutter 64 by a plurality of pusher wheels 66. These wheels are mounted on central shafts 68 which are journalled in pillow blocks 70 mounted on bearing hangers 54 and vertical frame members 36 and 37. A cylindrical core 72 surrounds each shaft 68. A plurality of rows of resilient fingers 74 are tangentially mounted on cylindrical cores 72. The fingers contain an enlarged portion at the outer end thereof. The fingers may be made of any appropriate material such as rubber or plastic. During the operation of the crop harvesting machine 10, pusher wheels 66 are rotated in a counterclockwise direction, as shown in FIGURE 1, to move the vines along grates 56 and to push the ripe vegetables between the individual members of grates 56.

The forward appendage of each of the vegetable removing means 34 consists of a structure to pick the vines off the ground and position them on the grates 56. These structures include pick-up rolls 76 extending the width of vegetable removing means 34. The pick-up rolls 76 are positioned close to the ground and contain a plurality of rows of resilient rods 78 mounted on an angle thereto which, when the rolls 76 are driven in a counterclockwise direction (FIGURE 1) as the machine is propelled forward, engage the vines to lift them off the ground and place them on driven belts 80. Belts 80 transport the vines upward and place them on transfer rolls 81, which in turn place them on the front ends of grates 56. Both pick-up rolls 76 and transfer frame rolls 81 are supported by the structures 85 of belts 80. The position of pick-up rolls 76 and belts 80 may be adjusted by means of adjustable struts 82.

The rear appendage of each of the vegetable removing means 34 consists of a transverse conveyor 84 which transports the harvested vegetables or fruits from the vegetable removing means 34 and conveyor 95 which transports the fruits or vegetables to a storage container towed by the prime mover. The rear ends of conveyors 46 are slightly elevated by the use of idlers 83 and 185 to permit vegetables thereon to be deposited on transverse conveyors 84. The conveyors have cleats 86 on their surfaces to assist in this operation. Shields 88 prevent vines expelled from cutters 64 from interfering with the operation of conveyors 84.

The power for operation of the various portions of the crop harvesting machine 10 is supplied from the prime mover. A sprocket 90 is mounted on each rear axle 91 extending from transmission 20 to drive shafts 96 on each vegetable removing means 34 through chains 95 and clutches 92. While clutches 92 are shown as jaw clutches, they may be any type which will permit the selective application of power to crop harvesting means 10. Shaft 96 is journalled in bearings 93 mounted on frame member 52. On the outer end of each of shafts 96 is a sprocket and chain drive 100 which drives the pusher wheels 66.

Bevel gears 102 provide rotation to vertical shafts 103 which through additional sets of bevel gears 104 provide power to main drive shafts 106 mounted on the outside of each of the vegetable removing means 34 in bearings 99. Vertical shafts 103 are journalled in pillow blocks 105 mounted on vertical member 37. The rear ends of shafts 106 provide power to transverse conveyors 84 by means of sprocket and chain drives 108. Bevel gears 110 operate conveyors 46 by means of additional chain and sprocket drives 112 which drive rear pulleys 114 of the conveyors 46. Conveyors 46 may be of the type shown in the figures wherein a canvas or rubber bed is stretched between pulleys 114 and 116 and fastened at spaced intervals to drive chains 115 on either side thereof which are driven by sprockets on pulley 114.

The inside ends of pulleys 114 extend beyond pans 38 and operate the inner guides comprising long belts 118 extending between pulleys 117 and 119 on the side of each of the vegetable removing means 34 adjacent the vines. The belts are driven in the same direction as conveyors 46, that is, with the upper portion moving rearwardly to aid the crop harvesting machine in moving along a row of vines.

Cutters 64 are driven from main drive shaft 106 through chain and sprocket drive 121 and cam mechanism 120. Cam mechanism 120 has the appropriate linkages 122 to provide reciprocating motion to the cutters 64.

Wind-up rolls 61 are driven by bevel gears 123 mounted on vertical shafts 103. As previously mentioned, these rolls are driven slightly faster than pusher rolls 66 to exert a rearward pull on the vines.

The forward ends of main drive shafts 106 drive eccentric rollers 58 through bevel gears 124. The outer ends of the eccentric rollers 58 power chain and sprocket drives 126 which drive belts 80, pick-up rolls 76, and transfer rolls 81 through the rear pulleys 89 of belts 80. Pick-up rolls 76 are driven by V-belts 183 on either side of belts 80. Transfer rolls 81 are driven by belts 87. Forward inner guides 128 adjacent pick-up rolls 76 and belts 80 are also driven by rear pulleys 89 to assist the passage of the crop harvesting machine 10 past the vines.

In operation, the crop harvesting machine 10 operates as follows. The set screws 33 on collars 30 are loosened, and the vegetable removing means 34 are adjusted inwardly or outwardly depending on the thickness of the rows of vines, down which the machine will travel. The set screws 33 are tightened after adjustment. The machine is then moved into a position to straddle a row of vines. As the machine starts down the row, clutch 92 is engaged, applying power to the operative parts of the vegetable removing means 34. Pick-up rolls 76 pick up the vines as they lie on the ground on either side of the row and place them on conveyors 80. Conveyors 80 deposit the vines on the forward end of grates 56. The vines are then moved along grates 56, at a rate approximately equal to the rate of travel of the machine, by pusher wheels 66. The vibrations of the grates 56, combined with the downward pushing action of pusher wheels 66, cause the ripe vegetables to extend below grates 56 or to fall off the vine onto conveyors 46. The unripe vegetables lacking sufficient weight and size remain embedded in the mass of the vines. As the vines approach the rear of the grates 56, vegetable guides 62 or cutters 64 sever the vegetables from the vine. These vegetables, along with those that have previously fallen onto conveyors 46 are moved rearwardly by those conveyors and deposited on transverse conveyors 84 for transport from the machine. The vines slide rearwardly over shield 88 and are redeposited on the ground, otherwise undisturbed.

FIGURES 7, 8 and 9 show another embodiment of the crop harvesting machine of the present invention. Identical components are given similar numbers in all figures. The embodiment of FIGURES 7, 8 and 9 differs from the embodiment shown in the previous figures by the provision of a different type of supporting structure for the vines in the vegetable removing means. The supporting structure employed by this embodiment consists of a plurality of belts which move rearwardly as they support the vines. Specifically, in FIGURE 7, a plurality of elongated belts 130 are strung between pulleys 132 and 134 beneath pusher rolls 66. The belts are supported by channels 136 which extend between the pulleys and are mounted on cross members 137 of pan 38. The upper portions of belts 130 are driven rearwardly by power supplied to either of pulleys 132 or 134, in a manner not shown, from main drive shafts 106.

Mounted in pans 38 between the upper and lower portions of belts 130 and between pulleys 132 and 134 are conveyors 138 and 140 which serve the same function as conveyors 46 and 84 in removing the harvested fruits or vegetables from vegetable removing means 34.

A cutter and wind-up roll assembly similar to that shown in the embodiment in FIGURE 1 and described above is included on the rear of pan 38 of each vegetable removing means 34 to sever the fruits or vegetables from the vines. Guards 142 and 144 prevent ripe vegetables falling from the vines from becoming immeshed in pulleys 132 and 134 while guards 146 assist the vines in returning to the ground.

In addition to the pick-up rolls 76, belts 80, and transfer rolls 81, employed to place the vines on the support structure, the embodiment shown in FIGURES 7 and 9 includes transverse conveyors 148. The upper portions of these conveyors move from the inside to the outside of vegetable removing means 34 and serve to extend the vines lengthwise as they enter vegetable removing means. Conveyors 148 may contain cleats 150 to assist in lengthening the vines. Conveyors 148 are operated more slowly than the other operative parts of vegetable removing means 34 so as not to uproot the vines while lengthening them. If desired, of course, conveyors similar to conveyors 148 may be placed on the vegetable removing means shown in FIGURE 1 by lengthening pan 38.

The power train for powering the vegetable removing means 34 of FIGURES 7 and 9 has not been shown for clarity, but it is understood that it may be similar to that shown in FIGURES 1 through 5.

The crop harvesting machine shown in FIGURES 7, 8 and 9 operates in a manner similar to the machine shown in FIGURES 1 through 6. Power is supplied to the operative parts as the machine starts down the row of vines. Pick-up rolls 76 pick up the vines as they lie on the ground on either side of the row and place them on conveyors 80. Conveyors 80 deposit the vines on conveyors 148 which extend the vines lengthwise. Transfer rolls 81 effect the transfer of the extended vines from conveyors 148 to belts 130. The belts 130, aided by pusher rolls 66, move the vines to the rear and push the ripe vegetables between the belts. Some ripe vegetables will drop from the vine during the rearward passage, while the remaining ripe vegetables will be severed by cutters 64. The vines then pass over windup roll 61 and down guard 146 to the ground.

FIGURES 1 and 4 show the addition of a blower 152 to the crop harvesting machine 10. The blower is mounted on, and powered by, the transmission 20 of power section 12. The output of blower 152 is supplied through flexible hoses 154 to manifolds 156 in the front of pans 38. The manifolds 156 may be pipes with slits cut in them mounted in pans 38 and may be rotatably mounted so the direction of the stream of air issuing therefrom is adjustable. The stream of air from manifolds 156 is used to remove dead leaves, blossoms, and weeds from the vines and to assist in pollinating the vines.

It is appreciated that other additions and modificatons may be made to the above-described structure, and it is intended to cover all such embodiments as come within the scope of the attached claims.

Various modes of carrying out the invention are contemplated as being within the scope of the following claims particularly pointing out and distinctly claiming the subject matter which is regarded as the invention.

I claim:

1. Apparatus for harvesting vegetables from vines growing in rows comprising:
    a frame transportable along the sides of the rows and substantially parallel therewith,
    means at the forward end of said frame for upwardly displacing only the vegetable bearing portions of the vines from their growing position,
    a plurality of laterally spaced elongated supporting members mounted on said frame and extending rearwardly from said vine displacement means for receiving the upwardly displaced vines therefrom while permitting the vegetables to fall or depend through the spaces therebetween,
    means mounted on said frame for propelling the displaced portions of the vines rearwardly along said supporting members,
    means mounted on said frame for retrieving vegetables which fall from the vines as they are propelled rearwardly,
    a cutter at the rear end of the supporting members for severing remaining depending vegetables from the vines,
    means independently of said propelling means adjacent said cutter and operable on the vines to pull the same from the cutting zone as the vegetables are severed therefrom, and means at the rear of said frame for collecting the harvested vegetables while permitting the vines to return to growing position for further growth and production.

2. Harvesting apparatus according to claim 1, wherein the vegetable severing cutter includes a reciprocating toothed blade.

3. Harvesting apparatus according to claim 1, wherein the means adjacent the cutter for pulling the vines from the cutting zone comprises a rotatable bladed member.

4. Harvesting apparatus according to claim 3, wherein the rotatable bladed member is driven at a faster peripheral speed than the rate of travel of the frame.

5. Harvesting apparatus according to claim 3, wherein the blades of the rotatable member are flexible.

6. Harvesting apparatus according to claim 1, wherein the frame includes a plurality of laterally spaced sets of vine displacement means, elongated supporting members, vine propelling means, vegetable retrieving means, vegetable severing cutters, vine pulling means and vegetable collecting means for traversing opposite sides of the rows of vines.

7. Apparatus for harvesting vegetables from vines growing in rows comprising:

a frame transportable along the sides of the rows and substantially parallel therewith, means at the forward end of said frame for upwardly displacing only the vegetable bearing portions of the vines from their growing position, means adjacent the vine displacement means for receiving the upwardly displaced vines and longitudinally extending the same transversely of the direction of travel of the frame, a plurality of laterally spaced elongated supporting members mounted on said frame and extending rearwardly from said vine extension means for receiving the extended vines therefrom while permitting the vegetables to fall or depend through the spaces therebetween, means mounted on said frame for propelling the displaced and extended portions of the vines rearwardly along said supporting members, means mounted on said frame for retrieving vegetables which fall from the vines as they are propelled rearwardly, means at the rear end of the supporting members for removing remaining depending vegetables from the vines, and means at the rear of said frame for collecting the harvested vegetables while permitting the vines to return to growing position for further growth and production.

8. Harvesting apparatus according to claim 7, wherein the vine extension means includes a conveyor element movable transversely of the direction of travel of the frame and away from the row of vines being harvested.

9. Harvesting apparatus according to claim 7, wherein the vine extension means comprises an endless belt conveyor.

10. Harvesting apparatus according to claim 7, wherein the frame includes a plurality of laterally spaced sets of vine displacement means, elongated supporting members, vine propelling means, vegetable retrieving means, vegetable removing means and vegetable collecting means for traversing opposite sides of the rows of vines.

11. Apparatus for harvesting vegetables from vines growing in rows comprising:

a frame transportable along the sides of the rows and substantially parallel therewith, means at the forward end of said frame for upwardly displacing only the vegetable bearing portions of the vines from their growing position, a plurality of laterally spaced elongated supporting members mounted on said frame and extending rearwardly from said vine displacement means for receiving the upwardly displaced vines therefrom while permitting the vegetables to fall or depend through the spaces therebetween, a plurality of rotatable members journalled in said frame above said supporting members, each of said members having laterally spaced sets of flexible fingers radiating therefrom above the spaces between said elongated supporting members, said fingers being mounted on said rotatable members for movement in planes lying between adjacent supporting members for propelling the displaced portions of the vines rearwardly along said supporting members, means mounted on said frame for retrieving vegetables which fall from the vines as they are propelled rearwardly, means at the rear end of the supporting members for removing remaining depending vegetables from the vines, and means at the rear of said frame for collecting the harvested vegetables while permitting the vines to return to growing position for further growth and production.

12. Harvesting apparatus according to claim 11, wherein the flexible fingers extend tangentially from their respective carrying members.

13. Harvesting apparatus according to claim 11, wherein the frame includes a plurality of laterally spaced sets of vine displacement means, elongated supporting members, finger carrying rotatable members, vegetable retrieving means, vegetable removing means and vegetable collecting means for traversing opposite sides of the rows of vines.

14. Harvesting apparatus according to claim 11, wherein the means for retrieving falling vegetables includes an endless conveyor having a vegetable receiving surface below the elongated supporting members and movable longitudinally thereof toward the rear of the frame.

15. Harvesting apparatus according to claim 14, wherein the means for collecting harvested vegetables includes an endless conveyor mounted at the rear of the frame below the discharge end of the endless vegetable retrieving conveyor and movable transversely thereof.

16. Harvesting apparatus according to claim 11, wherein an elongated rail is mounted on the frame above the vine supporting members for assisting in guiding the vines therealong.

17. Harvesting apparatus according to claim 11, wherein the laterally spaced elongated supporting members provide a grate, and the means for removing depending vegetables includes guiding and cutting elements on said grate.

References Cited

UNITED STATES PATENTS

| | | | |
|---|---|---|---|
| 1,251,425 | 12/1917 | Rogers et al. | 171—14 |
| 1,800,622 | 4/1931 | Granberg | 171—14 X |
| 2,528,689 | 11/1950 | Flynt | 171—132 |
| 2,703,953 | 3/1955 | Altemus. | |
| 3,070,944 | 1/1963 | Peto et al. | 56—327 |
| 2,841,947 | 7/1958 | Grew | 56—327 |
| 2,893,193 | 7/1959 | Gilbert | 56—327 |
| 3,331,197 | 7/1967 | O'Brien | 56—327 |

ABRAHAM G. STONE, *Primary Examiner.*

P. A. RAZZANO, *Assistant Examiner.*